US012598426B2

(12) United States Patent
Heikkinen et al.

(10) Patent No.: US 12,598,426 B2
(45) Date of Patent: Apr. 7, 2026

(54) CHANGE OF A MODE FOR CAPTURING IMMERSIVE AUDIO

(71) Applicant: Nokia Technologies Oy, Espoo (FI)

(72) Inventors: Mikko Olavi Heikkinen, Tampere (FI); Matti Sakari Hämäläinen, Tampere (FI); Juha Petteri Ojanperä, Tampere (FI); Juha Tapio Vilkamo, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 152 days.

(21) Appl. No.: 18/420,157

(22) Filed: Jan. 23, 2024

(65) Prior Publication Data

US 2024/0267678 A1 Aug. 8, 2024

(30) Foreign Application Priority Data

Feb. 8, 2023 (EP) .................................... 23155563

(51) Int. Cl.

| | |
|---|---|
| ***H04R 5/04*** | (2006.01) |
| ***H04R 3/00*** | (2006.01) |
| ***H04R 5/027*** | (2006.01) |
| ***H04R 5/033*** | (2006.01) |
| ***H04S 7/00*** | (2006.01) |

(52) U.S. Cl.

CPC ............... *H04R 5/04* (2013.01); *H04R 3/005* (2013.01); *H04R 5/027* (2013.01); *H04R 5/033* (2013.01); *H04S 7/30* (2013.01); *H04S 2400/11* (2013.01); *H04S 2400/15* (2013.01)

(58) Field of Classification Search

CPC .......... H04R 5/04; H04R 3/005; H04R 5/027; H04R 5/033; H04R 1/1016; H04R 1/1041; H04R 1/1083; H04R 2201/107; H04R 2410/05; H04R 2201/10; H04S 7/30; H04S 2400/11; H04S 2400/15

See application file for complete search history.

(56) References Cited

U.S. PATENT DOCUMENTS

| | | | | |
|---|---|---|---|---|
| 10,418,048 | B1 | 9/2019 | Hutchins et al. | |
| 11,523,244 | B1 * | 12/2022 | Meade .................. | H04R 3/005 |
| 2014/0172421 | A1 | 6/2014 | Liu et al. | |

(Continued)

FOREIGN PATENT DOCUMENTS

| | | | |
|---|---|---|---|
| EP | 3917160 | A1 | 12/2021 |
| WO | 2022/080612 | A1 | 4/2022 |

OTHER PUBLICATIONS

Extended European Search Report received for corresponding European Patent Application No. 23155563.2, dated Jul. 13, 2023, 8 pages.

*Primary Examiner* — Yogeshkumar Patel

(74) *Attorney, Agent, or Firm* — ALSTON & BIRD LLP

(57) ABSTRACT

A method comprising capturing, using a first capturing mode, immersive audio using a first capturing device comprising a first microphone and a second capturing device comprising a second microphone, recognizing, based on obtaining data from one or more sensors, movement of the first capturing device, wherein the movement is with respect to the second capturing device, recognizing the movement as movement for changing from the first capturing mode to a second capturing mode, wherein the second capturing mode is for capturing immersive audio, and capturing the immersive audio using the second capturing mode.

17 Claims, 4 Drawing Sheets

(56) References Cited

U.S. PATENT DOCUMENTS

| | | | | |
|---|---|---|---|---|
| 2020/0196043 | A1* | 6/2020 | Lovich | H04R 1/406 |
| 2021/0329381 | A1* | 10/2021 | Holman | G10L 19/008 |
| 2021/0329402 | A1* | 10/2021 | Laaksonen | H04R 1/1041 |
| 2022/0279305 | A1 | 9/2022 | Sheaffer et al. | |

* cited by examiner

CHANGE OF A MODE FOR CAPTURING IMMERSIVE AUDIO

RELATED APPLICATION

This application claims priority to European Patent Application No. 23155563.2, filed Feb. 8, 2023, which is incorporated herein by reference in its entirety.

FIELD

The present application relates to capturing immersive audio for providing an immersive user experience with rendering of the immersive audio.

BACKGROUND

Immersive audio may be utilized for an enhanced user experience that comprises rendering of the immersive audio. The immersive audio may be binaural audio or spatial audio for example. The immersive audio may be rendered for a call that may be a voice call or a video call, or the immersive audio may be rendered as part of rendering media content that comprises the immersive audio.

BRIEF DESCRIPTION

The scope of protection sought for various embodiments is set out by the independent claims. Dependent claims define further embodiments included in the scope of protection. The exemplary embodiments and features, if any, described in this specification that do not fall under the scope of the independent claims are to be interpreted as examples useful for understanding various embodiments of the invention.

According to a first aspect there is provided an apparatus comprising means for: capturing, using a first capturing mode, immersive audio using a first capturing device comprising a first microphone and a second capturing device comprising a second microphone, recognizing, based on obtaining data from one or more sensors, movement of the first capturing device, wherein the movement is with respect to the second capturing device, recognizing the movement as movement for changing from the first capturing mode to a second capturing mode, wherein the second capturing mode is for capturing immersive audio, and capturing the immersive audio using the second capturing mode.

In some example embodiments according to the first aspect, the means comprises at least one processor, and at least one memory storing instructions that, when executed by the at least one processor, to cause the performance of the apparatus.

According to a second aspect there is provided an apparatus comprising at least one processor, and at least one memory storing instructions that, when executed by the at least one processor, to cause the apparatus at least to perform: capture, using a first capturing mode, immersive audio using a first capturing device comprising a first microphone and a second capturing device comprising a second microphone, recognize, based on obtaining data from one or more sensors, movement of the first capturing device, wherein the movement is with respect to the second capturing device, recognize the movement as movement for changing from the first capturing mode to a second capturing mode, wherein the second capturing mode is for capturing immersive audio, and capture the immersive audio using the second capturing mode.

According to a third aspect there is provided a method comprising: capturing, using a first capturing mode, immersive audio using a first capturing device comprising a first microphone and a second capturing device comprising a second microphone, recognizing, based on obtaining data from one or more sensors, movement of the first capturing device, wherein the movement is with respect to the second capturing device, recognizing the movement as movement for changing from the first capturing mode to a second capturing mode, wherein the second capturing mode is for capturing immersive audio, and capturing the immersive audio using the second capturing mode.

In some example embodiments according to the third aspect the method is a computer implemented method.

According to a fourth aspect there is provided a computer program comprising instructions which, when executed by an apparatus, cause the apparatus to perform at least the following: capture, using a first capturing mode, immersive audio using a first capturing device comprising a first microphone and a second capturing device comprising a second microphone, recognize, based on obtaining data from one or more sensors, movement of the first capturing device, wherein the movement is with respect to the second capturing device, recognize the movement as movement for changing from the first capturing mode to a second capturing mode, wherein the second capturing mode is for capturing immersive audio, and capture the immersive audio using the second capturing mode.

According to a fifth aspect there is provided a computer program comprising instructions stored thereon for performing at least the following: capturing, using a first capturing mode, immersive audio using a first capturing device comprising a first microphone and a second capturing device comprising a second microphone, recognizing, based on obtaining data from one or more sensors, movement of the first capturing device, wherein the movement is with respect to the second capturing device, recognizing the movement as movement for changing from the first capturing mode to a second capturing mode, wherein the second capturing mode is for capturing immersive audio, and capturing the immersive audio using the second capturing mode.

According to a sixth aspect there is provided a non-transitory computer readable medium comprising program instructions that, when executed by an apparatus, cause the apparatus to perform at least the following: capture, using a first capturing mode, immersive audio using a first capturing device comprising a first microphone and a second capturing device comprising a second microphone, recognize, based on obtaining data from one or more sensors, movement of the first capturing device, wherein the movement is with respect to the second capturing device, recognize the movement as movement for changing from the first capturing mode to a second capturing mode, wherein the second capturing mode is for capturing immersive audio, and capture the immersive audio using the second capturing mode.

According to a seventh aspect there is provided a non-transitory computer readable medium comprising program instructions stored thereon for performing at least the following: capturing, using a first capturing mode, immersive audio using a first capturing device comprising a first microphone and a second capturing device comprising a second microphone, recognizing, based on obtaining data from one or more sensors, movement of the first capturing device, wherein the movement is with respect to the second capturing device, recognizing the movement as movement for changing from the first capturing mode to a second capturing mode, wherein the second capturing mode is for capturing immersive audio, and capturing the immersive audio using the second capturing mode.

According to an eighth aspect there is provided a computer readable medium comprising program instructions that, when executed by an apparatus, cause the apparatus to perform at least the following: capture, using a first capturing mode, immersive audio using a first capturing device comprising a first microphone and a second capturing device comprising a second microphone, recognize, based on obtaining data from one or more sensors, movement of the first capturing device, wherein the movement is with respect to the second capturing device, recognize the movement as movement for changing from the first capturing mode to a second capturing mode, wherein the second capturing mode is for capturing immersive audio, and capture the immersive audio using the second capturing mode.

According to a ninth aspect there is provided a computer readable medium comprising program instructions stored thereon for performing at least the following: capturing, using a first capturing mode, immersive audio using a first capturing device comprising a first microphone and a second capturing device comprising a second microphone, recognizing, based on obtaining data from one or more sensors, movement of the first capturing device, wherein the movement is with respect to the second capturing device, recognizing the movement as movement for changing from the first capturing mode to a second capturing mode, wherein the second capturing mode is for capturing immersive audio, and capturing the immersive audio using the second capturing mode.

DETAILED DESCRIPTION

Figure 1:
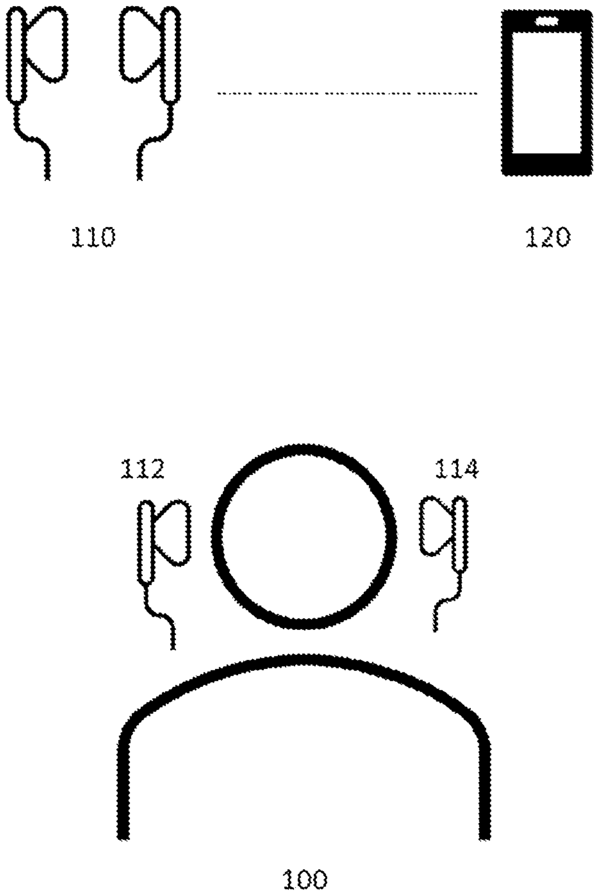
FIG. 1 illustrates an example embodiment of a user wearing a head set comprising ear-worn devices.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

Immersive audio may be used to enhance a user experience when audio is rendered. Such enhanced user experience may be present for example during a voice call, a video call, or when rendering audio as such or as part of other media content such as video or still images. Immersive audio may be understood to be binaural audio, spatial audio, or a combination thereof. For example, when immersive audio is rendered using a headset worn by a user, the binaural audio may be utilized. Binaural audio may be captured using for example two microphones and it may be used for providing the user with a perceptually three-dimensional headphone-reproduced stereo sound that provides a user experience mimicking the user actually being present in the room from which the binaural audio was captured. Spatial audio on the other hand may comprise a full sphere surround-sound that mimics the way the user would perceive the rendered immersive audio in real life. Spatial audio may comprise audio that is perceived by the user to originate from a certain direction and/or distance, and thus the rendered spatial audio is perceived to change with the movement of the user or with the user turning. Spatial audio may comprise audio that is perceived to originate from one or more sound sources, ambient sound or a combination thereof. Ambient sound may comprise audio that might not be identifiable in terms of a sound source such as traffic humming, wind or waves.

To capture immersive audio, a plurality of capturing devices, that are for capturing audio, and comprise one or more microphones per capturing device, may be used. The plurality of capturing devices may comprise for example ear-worn devices such as earbuds and in-ear headphones. For example, if a headset is worn by a user and the headset comprises two earbuds that each comprise at least one microphone, the headset may be used to capture immersive audio such as binaural audio around the user. Such a headset may be a true wireless stereo headset with integrated microphones. FIG. 1 illustrates an example embodiment of the user 100 wearing a head set 110 that comprises ear-worn devices, that in this example embodiment are two earbuds 112, 114 to be worn by the user. The earbud 112 goes to the left ear of the user 100 and the earbud 114 goes to the right ear of the user 100. The head set 110 in this example embodiment is connected to a mobile device 120 and it receives audio, from the mobile device, to be rendered from the mobile device and the head set 110, when capturing audio, provides the captured audio to the mobile device 120. The mobile device 120 may be any suitable device such as a mobile phone, a smart watch, a laptop or a tablet computer. The mobile device 120 and the head set 110 may be used for a call, that may be a voice call or a video call, and by using the head set 110, immersive audio may be captured from around the user 100 and such audio may be provided to the one or more other users in the call. Such call may be understood as an immersive call.

If a user is in a call that is an immersive call such as described above, it may be difficult to capture the immersive audio, without the voice of the user drowning, when the environmental sounds are loud. While the environmental sounds are relevant for capturing the immersive audio and providing the user experience for the immersive call, having environmental sounds that are too loud can cause the voice of the user to be drowned and thus it may be difficult for another party in the call to hear the user well enough. The user could of course talk louder, but that may be inconvenient due to privacy of the call being compromised or others around the user perceiving talking loudly as rude. Beamforming techniques may be used to better capture the voice of the user and thus cancel some of the environmental sounds perceived as disturbing. Further, microphones with a narrow directive capture pattern may be utilized to mitigate the disturbing environmental sounds. Further, additionally or alternatively, machine learning methods may be used to mitigate the disturbing environmental sounds.

When capturing immersive audio during a call, earbuds comprised in a head set and worn by a user may be used as capturing devices for capturing immersive audio. The earbuds comprising microphones may be located such that they are in good placements in terms of capturing surrounding spatial sounds. Yet, in some example embodiments, such placement may not be most optimal if the speech of the user is to be captured and thus it may be useful to move at least one of the two earbuds closer to the mouth of the user to better capture the speech of the user.

Figure 2:
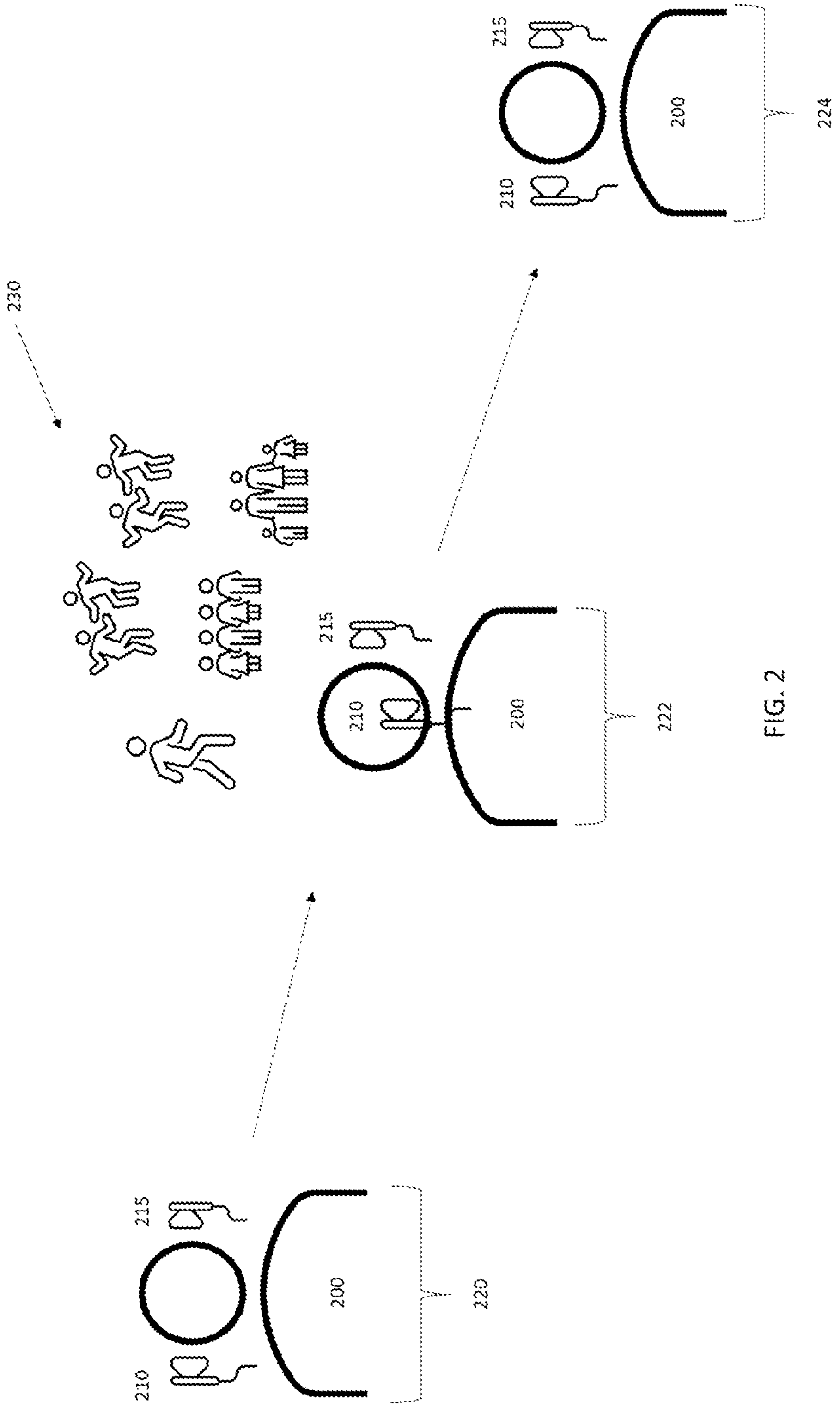
FIG. 2 illustrates an example embodiment of a user being in a call that is an immersive call.

FIG. 2 illustrates another example embodiment in which a user 200 is in a call, that is an immersive call, and is using a headset comprising two earbuds 210 and 215 that are worn by the user and those are also used as capturing devices for capturing immersive audio for the immersive call. The earbuds 210 and 215 both comprise at least one integrated microphone for capturing audio for the call. The audio is immersive audio that comprises binaural audio and also speech of the user 200. The earbuds 210 and 215 also render to the user the audio provided by at least one other party in the call. The ongoing call may be enabled by a mobile device to which the earbuds 210 and 215 are connected to. In this example embodiment, in situation 220, the user wears the earbuds 210 and 215 while the immersive call is ongoing and the binaural audio is captured high quality and the voice of the user 200 is heard well by the at least one other party in the ongoing call. In this situation 220, the audio for the immersive call is captured using a first capturing mode that corresponds to the capturing devices capturing binaural audio. In this example embodiment the binaural audio may be captured using the capturing devices, that are the earbuds 210 and 215 in this example embodiment, without further processing because the microphones are located near the ears of the user 200 thus making the setup useful for capturing the binaural sound as the user 200 hears it. Optionally, further processing may be performed to improve the capturing of the immersive audio by using any suitable method for improving the capturing. It is to be noted that in some example embodiment, it is also possible to capture a parametric representation of spatial audio that can be manipulated during the playback of the captured immersive audio. A parametric representation of the spatial audio means audio signal(s) and associated spatial metadata indicating the organization of the sound scene such as sound direction parameters.

Then, in situation 222, the user 200 moves close to a noisy crowd 230 while the immersive call is still ongoing. Thus, the environmental sounds captured by the capturing devices, that is, by the earbuds 210 and 215, become loud enough to be perceived as disturbing as the at least one other party in the immersive call is having trouble hearing the voice of the user 200 because of the loud environmental sounds that may also be referred to as background noise. Thus, in this example embodiment, the user 200 removes the earbud 210 from his ear and places it closer to his mouth. Thus, the earbud 210 is moved with respect to the earbud 215, which is still worn in the other ear of the user 200. This movement may be interpreted as a trigger to switch to another mode of capturing immersive audio for the ongoing call. In this other mode, the earbud 210 captures a mono object-stream of the voice of the user 200. The residual of the object signal and the signal captured by the earbud 215 may be used to extract ambient sound. As the earbud 210 is moved such that it is now closer to the mouth of the user 200, this placement increases the signal to noise ratio of the audio captured for the voice of the user 200, which allows capturing spatial audio differently, in other words, allows capturing the audio for the immersive call using another mode for capturing. The earbud 210 may comprise one or more microphones and as they are close to the mouth, the captured audio may be processed as an object source. As mentioned, in this example embodiment, the voice of the user 200 is captured as a mono stream that is rendered to the immersive audio during the playback of the captured immersive audio. The object may thus be for example panned to different locations in the sound scene of the immersive audio that is captured during the rendering of the immersive audio. The earbud 215 may also comprise one or more microphones which in the second mode of capturing may be used to capture ambient sound that may also be understood as background noise. It is to be noted that the one or more microphones from both earbuds 210 and 215 may also be used for capturing ambient sound in the other capturing mode as well, which may have the benefit of making it easier to remove the voice of the user 200 from the ambience sound captured.

In the second mode of capturing the voice of the user 200 captured using the earbud 210 may comprise that the voice of the user 200 is removed from the ambient sound. This may be performed in any suitable manner, and it may be performed by any suitable device such as by the mobile device to which the earbuds 210 and 215 are connected to and which is used for enabling the immersive call. It is also to be noted that the mobile device may be the device that recognizes the movement of the earbud 210 as a movement based on which the capturing mode is changed from the first capturing mode to the second capturing mode.

For example, the speech signal captured by the earbud 210, the voice of the user 200, that is the speech signal, can be used for removing the speech signal from the ambient sound captured by the earbud 215. The removal of the voice of the user 200 may be performed for example by first defining a speech signal corresponding to the voice of the user 200 based on the sound captured by the earbud 210. For example, the speech signal may be directly the microphone signal captured by the earbud 210. Alternatively, the speech signal obtained from the earbud 210 may be enhanced using for example ambient noise reduction methods, and/or by using machine-learning based speech enhancement methods. After defining the speech signal, the acoustic path of the speech signal to the at least one other microphone comprised in the earbud 215 is estimated using any suitable method such as those used in the field of acoustic echo cancellation. Next, the speech signal may be processed with the estimated acoustic path, and subtracted from the audio captured by the earbud 215 using the at least one other microphones. As a result, a mono speech signal and a mono remainder, such as the ambience, signals are obtained as separate signals. It is then possible to synthesize spatial ambience based on the remainder signal by means of decorrelating the remainder signal to two incoherent remainder channels and cross-mixing these channels as a function of frequency to obtain the required binaural cross-correlation. Then, the speech signal may be processed further for example with a pair of head-related transfer functions (HRTF) to a desired direction, to front for example, and the further processed speech signal may then be added to the binaural ambience signal. The levels of the speech signal and the remainder signal may be set to desired levels, for example, by ensuring at least a defined speech-to-remainder energy ratio. Alternatively, the speech signal and the remainder signals may be transmitted separately to the recipient device, for example to the device of the at least one other party used for participating in the immersive call, so that the speech position can be controlled at the decoder of the recipient device.

As illustrated in the situation 222 of the FIG. 2, the movement of the earbud 210, that is a movement different than the movement of the earbud 215, and which movement is with respect to the earbud 215 also, is determined to indicate that the capturing mode is to be changed and as a result, the device controlling the capturing, such as the mobile device to which the earbuds 210 and 215 are connected to, changes the capturing mode. In this example embodiment, the user 200 moves the earbud 210 from his ear to be in front of the mouth of the user 200. In this example embodiment, no further user interaction is needed for changing the capturing mode, for example, no selection done on touch screen etc. is required. Recognizing the movement of the earbud 210 may be done using for example an optical or proximity sensor embedded in the earbud 215. In other words, sensor data may be obtained from the earbud 210 and based on the sensor data, the movement corresponding to movement indicating change of the capturing mode is recognized. It is to be noted that the recognition may be performed directly, for example if the sensor data if the sensor data is regarding the movement as such, or the recognition may be performed indirectly based on data that is received from a sensor such as proximity sensor or optical sensor and based on such data, it can be recognized that the earbud 210 has moved and the movement corresponds to movement indicating change of the capturing mode. Further, in some example embodiments, the recognition may be performed as a combination of direct and indirect manner if sensor data is received from a plurality of sensors and some of the plurality of sensors provide data regarding the movement as such and other provide data related to the movement. Additionally, sensor data may further be used for recognizing when the user 200 removes the earbud 210 for some other reason and not for changing the capturing mode. For example, inertial sensors may be used to track the location or movement of the earbud 210 for recognizing movement that is not for changing the capturing mode. Further, additionally or alternatively, analysis of input audio, which may also be understood as sensor data that is obtained using one or more microphones, may be used to determine, if the voice of the user 200 is louder in the removed earbud 210 than in the worn earbud 215, which would indicate that the removed earbud is being used as a close-up microphone for voice, and thus it may be recognized, based on the analysis of the audio captured, which is the input audio, that the movement of the earbud 210 corresponds to movement for changing the capturing mode.

When the capturing mode is changed, the type of immersive audio captured changes and the other parties present in the immersive call are to be informed regarding this change. Also, the audio stream that is transmitted to the other parties in the call changes. To address this, the device of the user 200, which is the device allowing the immersive call to occur for the user 200, detects that the capturing mode is to be changed based on the movement of the earbud 210, which is also detected as described above. Then the device may determine parameters for the second mode of capturing, for example, it may be determined which of the earbuds 210 and 215 has been moved and to which position. Next, the change of the capturing mode and configurations related to the second capturing mode may be indicated to the at least one other party in the call. Based on the configurations for the second capturing mode, the mobile device then sets up accordingly codecs to capture the object, that is the speech of the user 200, and the ambient sound and then begins to transit those as an immersive audio stream to the at least one other party present in the immersive call.

In this example embodiment, the switching of the capturing mode may cause a small interruption in the immersive audio stream transmitted to the at least one other party present in the call. Such interruption may be mitigated for example by fading out the immersive audio captured using the current mode of capture and fading in the immersive audio captured using the new capture mode after it has started. As an alternative example, both capture modes may be running simultaneously for a while, in other words, for a pre-determined time period, and also crossfading between them may be performed.

In this example embodiment, the user 200 then moves away from the crowd 230 as illustrated in situation 224. As a consequence, the environment is not noisy anymore, so the user 200 moves the earbud 210 back into his ear. Now the device to which the earbuds 210 and 215 are connected to again recognizes the movement of the earbud 210 that is movement different than the movement of the earbud 215 and is also with respect to the earbud 215. Based on recognizing this movement, the device reverts back to the original binaural capture mode, that is, back to the first capturing mode.

It is to be noted that in some example embodiments, further movement of a capture device such as an earbud may be used for further interaction than changing the capturing mode from a first capturing mode to a second capturing mode. The further interaction may comprise for example controlling of the capturing of the immersive audio. For example, if the second capturing mode is as described in the example embodiment of FIG. 2, then moving the earbud in the second capturing mode for example clockwise may be used to add more noise reduction to the capturing of the speech signal and turning the earbud counter-clockwise may be used to reduce noise reduction. Additionally, or alternatively, further movement of the earbud may be used to control the mix of ambient sound and direct speech signal. For example, with more ambient sound mixed in, or with less noise reduction, the user experience in the immersive call may be more pleasant to the at least one other party present in the call as long as they can also hear the voice of the user 200 well.

The example embodiments described above may have benefits such as having the voice of a user audible in various situations when immersive audio is captured for an immersive call or for other immersive media capturing purpose. Also, the immersive capturing may be maintained with minimal effect on the quality of the captured immersive audio. The user interaction may also be perceived as intuitive.

Figure 3:
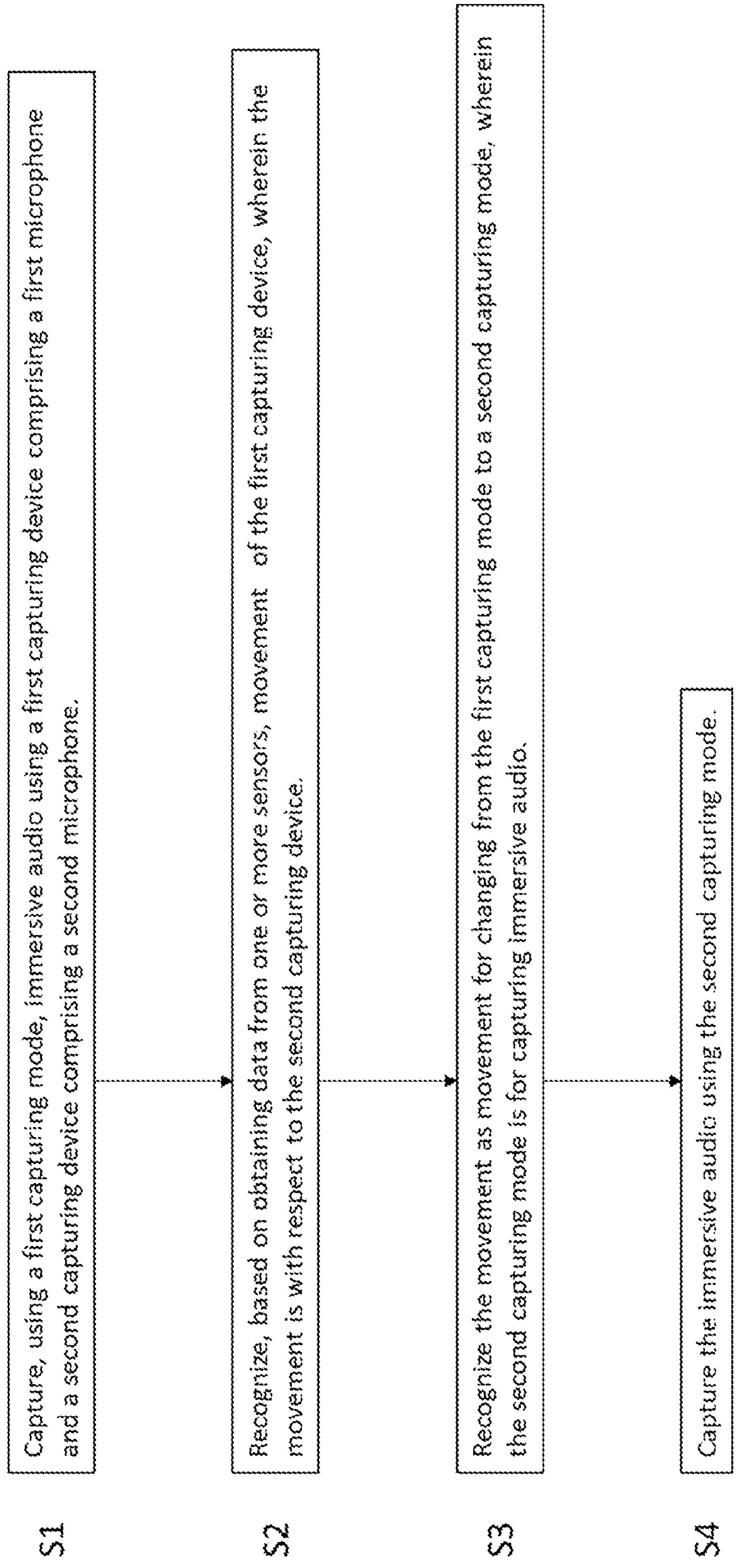
FIG. 3 illustrates a flow chart according to an example embodiment.

FIG. 3 is to be a flow chart according to an example embodiment. First, in block S1, immersive audio is captured, using a first capturing mode, and using a first capturing device comprising a first microphone and a second capturing device comprising a second microphone. Then in block S2, based on obtaining data from one or more sensors, movement of the first capturing device is recognized, wherein the movement is with respect to the second capturing device. Next, in block S3, the movement is recognized as movement for changing from the first capturing mode to a second capturing mode, wherein the second capturing mode is for capturing immersive audio. Finally, in block S4, the immersive audio is captured using the second capturing mode.

Figure 4:
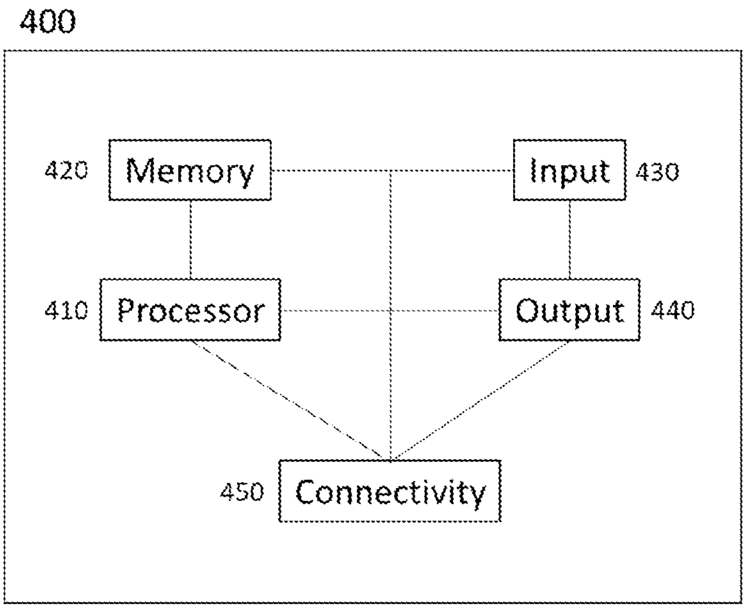
FIG. 4 illustrates an example embodiment of an apparatus.

FIG. 4 illustrates an exemplary embodiment of an apparatus 400, which may be or may be comprised in a device such as a mobile device, according to an example embodiment. The apparatus 400 comprises a processor 410. The processor 410 interprets computer program instructions and process data. The processor 410 may comprise one or more programmable processors. The processor 410 may comprise programmable hardware with embedded firmware and may, alternatively or additionally, comprise one or more application specific integrated circuits, ASICs.

The processor 410 is coupled to a memory 420. The processor is configured to read and write data to and from the memory 420. The memory 420 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 420 stores computer readable instructions that are execute by the processor 410. For example, non-volatile memory stores the computer readable instructions and the processor 410 executes the instructions using volatile memory for temporary storage of data and/or instructions.

The computer readable instructions may have been pre-stored to the memory 420 or, alternatively or additionally, they may be received, by the apparatus, via electromagnetic carrier signal and/or may be copied from a physical entity such as computer program product. Execution of the computer readable instructions causes the apparatus 400 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 400 further comprises, or is connected to, an input unit 430. The input unit 430 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 430 may comprise an interface to which external devices may connect to.

The apparatus 400 also comprises an output unit 440. The output unit comprises or is connected to one or more displays capable of rendering visual content such as a light emitting diode, LED, display, a liquid crystal display, LCD and a liquid crystal on silicon, LCoS, display. The output unit 440 further comprises one or more audio outputs. The one or more audio outputs may be for example loudspeakers or a set of headphones.

The apparatus 400 may further comprise a connectivity unit 450. The connectivity unit 450 enables wired and/or wireless connectivity to external networks. The connectivity unit 450 may comprise one or more antennas and one or more receivers that may be integrated to the apparatus 400 or the apparatus 400 may be connected to. The connectivity unit 450 may comprise an integrated circuit or a set of integrated circuits that provide the wireless communication capability for the apparatus 400. Alternatively, the wireless connectivity may be a hardwired application specific integrated circuit, ASIC.

It is to be noted that the apparatus 400 may further comprise various component not illustrated in the FIG. 4. The various components may be hardware component and/or software components.

Example embodiments described herein may be implemented using software, hardware, application logic or a combination of them. Also, if desired, different functionalities discussed herein may be performed in a different order, some functionalities may be performed concurrently, and, if desired, some of the above-mentioned functionalities may be combined. Although various aspects of the invention are set out in the independent claims, other aspects of the invention comprise other combinations of features from the described embodiments and/or dependent claims with features of the independent claims and not solely the combinations explicitly set out in the claims.

It will be appreciated that the above described example embodiments are purely illustrative and are not limiting on the scope of the invention. Other variations and modifications will be apparent to persons skilled in the art upon reading the present specification.

The invention claimed is:

1. An apparatus comprising:

at least one processor; and at least one memory storing instructions that, when executed by the at least one processor, cause the apparatus at least to:

capture, in a first capturing mode, first immersive audio, comprising binaural audio, using a first microphone comprised by a first capturing device and a second microphone comprised by a second capturing device;

recognize, based on data received from one or more sensors, a detected movement of the first capturing device;

recognize the detected movement as matching a movement assigned to trigger a change from the first capturing mode to a second capturing mode, wherein the movement assigned to trigger the change comprises a user moving the first capturing device from an ear of the user to closer to a mouth of the user; and capture, in the second capturing mode, second immersive audio comprising spatial audio by using the first microphone to capture a speech signal and using the second microphone to capture ambient sound.

2. An apparatus according to claim 1, wherein the apparatus is further caused to use the speech signal captured by the first capturing device for removing the speech signal from the ambient sound, captured using the second capturing device, in the second capturing mode.

3. An apparatus according to claim 2, wherein removing the speech signal comprises:

defining the speech signal corresponding to a voice of the user based on sound captured using the second capturing device;

estimating an acoustic path of the speech signal; and obtaining a mono speech signal and a mono remainder from the sound captured using the second capturing device by processing the speech signal with the estimated acoustic path and subtracting the speech signal from the sound captured using the second capturing device.

4. An apparatus according to claim 1, wherein the first immersive audio and the second immersive audio are for an immersive call and the apparatus is further caused to indicate the change from the first capturing mode to the second capturing mode to at least one other party present in the immersive call.

5. An apparatus according to claim 1, wherein the apparatus is further caused to control the capturing of the second immersive audio in the second capturing mode based on further movement of the first capturing device.

6. An apparatus according to claim 1, wherein the change from the first capturing mode to the second capturing mode comprises fading out the first immersive audio captured using the first capturing mode and fading in the second immersive audio captured using the second capturing mode.

7. An apparatus according to claim 1, wherein the change from the first capturing mode to the second capturing mode comprises running both capturing modes simultaneously for a pre-determined time period.

8. An apparatus according to claim 1, wherein at least one of the one or more sensors is comprised in the first capturing device.

9. An apparatus according to claim 1, wherein the one or more sensors comprise one or more of the following: an optical sensor, a proximity sensor, a microphone or an inertial sensor.

10. An apparatus according to claim 1, wherein the first capturing device is a first ear-worn device and the second capturing device is a second earbud.

11. A method comprising:

capturing, in a first capturing mode, first immersive audio, comprising binaural audio, using a first microphone comprised by a first capturing device and a second microphone comprised by a second capturing device;

recognizing, based on data received from one or more sensors, a detected movement of the first capturing device;

recognizing the detected movement as matching a movement assigned to trigger a change from the first capturing mode to a second capturing mode, wherein the movement assigned to trigger the change comprises a user moving the first capturing device from an ear of the user to closer to a mouth of the user; and capturing, in the second capturing mode, second immersive audio comprising spatial audio by using the first microphone to capture a speech signal and using the second microphone to capture ambient sound.

12. A method according to claim 11, further comprising using the speech signal captured by the first capturing device for removing the speech signal from the ambient sound, captured using the second capturing device, in the second capturing mode.

13. A method according to claim 12, wherein removing the speech signal comprises:

defining the speech signal corresponding to a voice of the user based on sound captured using the second capturing device;

estimating an acoustic path of the speech signal; and obtaining a mono speech signal and a mono remainder from the sound captured using the second capturing device by processing the speech signal with the estimated acoustic path and subtracting the speech signal from the sound captured using the second capturing device.

14. A method according to claim 11, wherein the first immersive audio and the second immersive audio and for an immersive call and the method further comprising indicating the change from the first capturing mode to the second capturing mode to at least one other party present in the immersive call.

15. A non-transitory computer readable medium comprising program instructions stored thereon for performing at least the following:

capturing, in a first capturing mode, first immersive audio, comprising binaural audio, using a first microphone comprised by a first capturing device and a second microphone comprised by a second capturing device;

recognizing, based on data received from one or more sensors, a detected movement of the first capturing device;

recognizing the detected movement as matching a movement assigned to trigger a change from the first capturing mode to a second capturing mode, wherein the movement assigned to trigger the change comprises a user moving the first capturing device from an ear of the user to closer to a mouth of the user; and capturing, in the second capturing mode, second immersive audio comprising spatial audio by using the first microphone to capture a speech signal and using the second microphone to capture ambient sound.

16. An apparatus according to claim 1, wherein the data is received from one or more sensors of a mobile device electronically connected to the first capturing device and the second capturing device.

17. An apparatus according to claim 2, wherein defining the speech signal corresponding to the voice of the user further comprises enhancing the sound captured by the second capturing device using at least one of ambient noise reduction or a speech enhancement machine learning model.

* * * * *